(12) United States Patent
Park et al.

(10) Patent No.: US 9,958,031 B2
(45) Date of Patent: May 1, 2018

(54) VACUUM CLEANER

(71) Applicant: SAMSUNG ELECTRONICS CO., LTD., Suwon-si (KR)

(72) Inventors: Hyun Uk Park, Suwon-si (KR); Seung Il Han, Suwon-si (KR); Jun Won Seo, Suwon-si (KR); Jea Won Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 747 days.

(21) Appl. No.: 14/520,800

(22) Filed: Oct. 22, 2014

(65) Prior Publication Data

US 2015/0114155 A1 Apr. 30, 2015

(30) Foreign Application Priority Data

Oct. 28, 2013 (KR) .......................... 10-2013-0128620

(51) Int. Cl.
*F16H 1/20* (2006.01)
*A47L 9/00* (2006.01)

(52) U.S. Cl.
CPC ............... *F16H 1/20* (2013.01); *A47L 9/009* (2013.01); *Y10T 74/19614* (2015.01)

(58) Field of Classification Search
None
See application file for complete search history.

(56) References Cited

U.S. PATENT DOCUMENTS

| 4,347,643 | A | | 9/1982 | Bair, III | |
|---|---|---|---|---|---|
| 4,658,458 | A | * | 4/1987 | Berfield | A47L 11/22 15/41.1 |
| 5,239,721 | A | * | 8/1993 | Zahuranec | A47L 11/32 15/41.1 |
| 5,504,971 | A | | 4/1996 | McCormick | |
| 8,348,798 | B2 | * | 1/2013 | Lo | B60K 1/04 180/65.51 |
| 8,419,580 | B2 | * | 4/2013 | Lo | A61G 5/04 180/65.51 |

(Continued)

FOREIGN PATENT DOCUMENTS

GB          2 056 594 A         3/1981

OTHER PUBLICATIONS

European Search Report dated Mar. 17, 2015 issued in corresponding European Patent Application 14190745.1.

(Continued)

*Primary Examiner* — Colby M Hansen
(74) *Attorney, Agent, or Firm* — Staas & Halsey LLP (57) ABSTRACT

A vacuum cleaner including a wheel, a driving motor configured to provide the wheel with a driving force, and a clutch configured to connect transfer gears to the wheel or to cancel a connection between the transfer gears and the wheel. A body of the vacuum cleaner is able to actively travel because of the transfer gears are connected to the wheel when power is applied to the driving motor and the wheel smoothly rotates without having a detent torque of the driving motor when power is not applied to the driving motor. The wheel is provided with an internal gear, and one of the transfer gears is configured to transfer the driving force of the driving motor by making contact with the internal gear.

20 Claims, 8 Drawing Sheets

(56) References Cited

U.S. PATENT DOCUMENTS

| | | | | |
|---|---|---|---|---|
| 8,419,581 B2* | 4/2013 | Lo | ............................ | B60K 1/04 |
| | | | | 180/65.51 |
| 8,500,591 B2* | 8/2013 | Turner | ................. | B60K 17/046 |
| | | | | 180/343 |
| 8,814,737 B2* | 8/2014 | Ishizuka | ............. | B60B 27/0073 |
| | | | | 180/65.6 |
| 9,085,334 B2* | 7/2015 | Hoffmann | ................. | B62K 1/00 |
| 2005/0015912 A1* | 1/2005 | Kim | ........................ | A47L 5/34 |
| | | | | 15/319 |
| 2008/0172809 A1* | 7/2008 | Park | ........................ | A47L 13/40 |
| | | | | 15/1.52 |
| 2009/0000840 A1* | 1/2009 | Murata | ................ | B60K 7/0007 |
| | | | | 180/65.51 |
| 2011/0124460 A1* | 5/2011 | Karlsson | ................. | B60L 15/20 |
| | | | | 475/150 |
| 2012/0258831 A1* | 10/2012 | Knoblauch | .............. | B60K 1/02 |
| | | | | 475/5 |

OTHER PUBLICATIONS

European Decision on Grant dated Nov. 3, 2016 in corresponding European Patent Application No. 14 190 745.1.

\* cited by examiner

VACUUM CLEANER

CROSS-REFERENCE TO RELATED APPLICATIONS

This application claims the benefit of Korean Patent Application No. 10-2013-0128620, filed on Oct. 28, 2013, in the Korean Intellectual Property Office, the disclosure of which is incorporated herein by reference.

BACKGROUND

1. Field

Embodiments of the present disclosure relate to a vacuum cleaner configured to travel in an active mode.

2. Description of the Related Art

In general, a vacuum cleaner represents a home appliance including a body, a fan motor generating a suction force, a suction nozzle suctioning air on a surface to be cleaned, a suction hose connecting the body to the suction nozzle, and a dust collecting apparatus removing dust from the suctioned air.

The vacuum cleaner may further include wheels, a driving motor generating a driving force, transfer gears transferring the driving force of the driving motor to the wheels, a sensor part sensing a motion of a user, and a control part allowing the driving motor to drive based on information sensed by the sensor part, thereby actively travelling according to motion of a user.

As for the active travelling type vacuum cleaner, when a user performs manipulation of moving the suction hose, the sensor part senses the movement of the suction hose and the control part drives the driving motor, so that the body actively travels. In this manner, movement of the body of the vacuum cleaner is easily achieved.

However, in a case in which the body is manually moved without using a driving force of the driving motor, the driving motor acts as a load, causing a difficulty in moving the vacuum cleaner.

Meanwhile, as for the conventional active travelling type vacuum cleaner, a transfer gear connected to wheels to transfer a driving force to the wheel is provided with a rotating shaft aligned with a rotating shaft of the wheels.

SUMMARY

Additional aspects and/or advantages will be set forth in part in the description which follows and, in part, will be apparent from the description, or may be learned by practice of the invention.

Therefore, it is an aspect of the present disclosure to provide a vacuum cleaner having a body actively traveling according to a user's motion, in which the connection between the wheel and the driving motor is canceled if a user desires to manually move the body in a state of the driving motor turned off, so that the wheel is smoothly rotated while prevented from being given a load from the driving motor.

It is an aspect of the present disclosure to provide an active travelling type vacuum cleaner having an enhanced spatial efficiency as a driving shaft of a transfer gear serving to transfer a driving force to a wheel is provided to be deviated from a driving shaft of a wheel.

In accordance with an embodiment of the present disclosure, a vacuum cleaner includes a body, wheels, a driving motor, transfer gears and a clutch. The wheels may be provided at both sides of the body, respectively. The driving motor may be configured to provide the wheels with a driving force. The transfer gears may be provided to be engaged with each other between the driving motor and the wheel. The clutch may be disposed between one of the transfer gears which is most adjacent to the wheel and the wheel to connect the transfer gears to the wheel such that the driving force of the driving motor is transferred to the wheel, or cancel the connection between the transfer gears and the wheel to prevent a detent torque of the driving motor and a rolling friction of the transfer gears from being transferred to the wheel while preventing noise due to the detent torque and the rolling friction from occurring.

A driving shaft of the driving motor may be provided to be parallel to a rotating shaft of the wheel.

The transfer gears may be each provided as a spur gear or a helical gear.

The vacuum cleaner may further include a gear housing configured to accommodate the transfer gears.

The clutch may be an electronic clutch using an electromagnetic force.

If power is applied to the driving motor, power may be applied to the electronic clutch to connect the transfer gears to the wheel, and if power applied to the driving motor is turned off, the electronic clutch is turned off to cancel the connection between the transfer gears and the wheel.

The electronic clutch may include a clutch engaged with the one of the transfer gears which is most adjacent to the wheel, and a clutch shaft inserted into the wheel to transfer the driving force to the wheel.

The clutch may be a mechanical clutch using a thrust of a gear.

The mechanical clutch may include a clutch gear, a clutch shaft and a cam. The clutch gear may be engaged with the one of the transfer gears which is most adjacent to the wheel. The clutch shaft may be connected to the clutch gear. The cam may be provided at one end of the clutch shaft so as to be connected to the wheel. The elastic member may allow the cam to be elastically biased in a direction getting distant from the wheel when the driving motor is turned off.

If power is applied to the driving motor, the cam may be connected to the wheel by a thrust of the clutch gear in an axial direction, and if power applied to the driving motor is turned off, the cam may be disconnected from the wheel by an elastic force of the elastic member.

In accordance with another embodiment of the present disclosure, a vacuum cleaner includes a body, wheels provided at both sides of the body, respectively, a driving motor configured to provide the wheels with a driving force, and transfer gears provided to be engaged with each other between the driving motor and the wheel. The wheel may include an internal gear that is engaged with a last transfer gear of the transfer gears which is most adjacent to the wheel to receive the driving force.

A rotating shaft of the last transfer gear may be deviated from a rotating shaft of the wheel.

A driving shaft of the driving motor may be provided to be parallel to a rotating shaft of the wheel.

The transfer gears may be each provided as a spur gear or a helical gear.

The vacuum cleaner may further include one or more idle gears provided to be engaged with the internal gear to rotatably support the wheel.

The vacuum cleaner may further include a support frame that supports the last transfer gear and the one or more idle gears.

The vacuum cleaner may further include a cover frame that is coupled to the support frame to accommodate the last transfer gear and the one or more idle gears.

As is apparent from the above, the vacuum cleaner is provided with wheels, a driving motor providing the wheels with a driving force, and a clutch connecting the wheels to the driving motor or canceling the connection between the wheels and the driving motor, so that a body actively travels by the driving force of the driving motor, and if a user desires to manually move the body in a state of the driving motor being stopped, the clutch cancels the connection between the wheels and the driving motor, thereby allowing the wheel to smoothly rotate without having a detent torque.

In addition, the transfer gear transferring a driving force to the wheels is provided with a rotating shaft deviated from a rotating shaft of the wheel, so that the space utilization of the body and the wheels can be improved, and various designs can be provided.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout.

Figure 1:
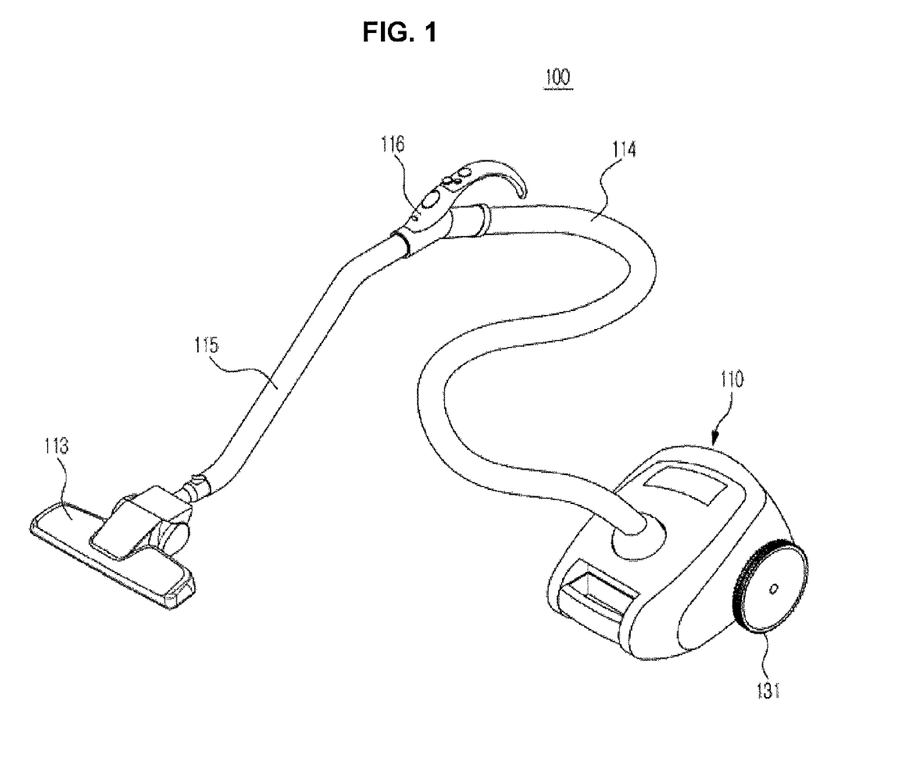
FIG. 1 is a view illustrating the external appearance of a vacuum cleaner in accordance with an embodiment of the present disclosure.

FIG. 1 is a view illustrating the external appearance of a vacuum cleaner in accordance with an embodiment of the present disclosure.

Referring to FIG. 1, a vacuum cleaner 100 includes a body 110 provided with a fan motor (not shown) generating a suction force and a dust apparatus (not shown) removing dust from the suctioned air, a suction nozzle 113 suctioning air from a surface to be cleaned, a handle pipe 116 allowing the suction nozzle 113 to be movable, an extension pipe 115 connecting the suction nozzle 113 to the handle pipe 116, and a suction hose 114 formed of flexible material connecting the handle pipe 116 to the body 110.

Air suctioned through the suction nozzle 113 sequentially passes through the extension pipe 115, the handle pipe 116 and the suction hose 114, and is guided to the dust collecting apparatus of the body 110. Air having dust removed is discharged to the outside of the body 110 again.

The dust collecting apparatus may be implemented using a dust bag scheme filtering dust by passing air through a dust bag or a cyclone scheme separating dust through a centrifugation. Alternatively, the dust collecting apparatus may be implemented in other schemes.

The vacuum cleaner 100 may further include wheel 131. While any number of wheels may be provided, in this embodiment wheel 131 is described as being provided at both sides of the body 110, respectively, to drive the body 110, driving motors 140 providing a driving force to each wheel 131, a sensor part (not shown) sensing a motion of a user, and a control part (not shown) controlling driving of the driving motor 140 based on information sensed by the sensor part.

The sensor part may sense motion of a user by sensing a movement of the suction hose 114. In this case, the motion of the suction hose 114 is sensed by measuring the distance between the handle pipe 116 and the body 110 or measuring a rotational displacement of a connector (not shown) connecting the suction hose 114 to the body 110. To this end, an ultrasonic range sensor may be provided on the handle pipe 116 or the body 110, or a displacement sensor may be provided on the connector between the suction hose 114 and the body 110.

The control part may control the driving of the driving motor 140 based on information sensed by the sensor part. The control part may allow the body 110 to move forward by simultaneously rotating the wheels 131, or to rotate to the left or right side by rotating one of the wheels 131.

As described above, the vacuum cleaner 100 in accordance with an embodiment of the present disclosure allows the body 110 to actively travel in an autonomous manner according to movement of a user. Accordingly, user convenience in cleaning is improved.

In addition, the vacuum cleaner 100 in accordance with this embodiment of the present disclosure is configured to allow the body 110 to move without receiving a load of the driving motor 140, that is, a detent torque of the driving motor 140, when a user manually desires to move the body 110 without using a driving force of the driving motor 140.

The vacuum cleaner 100 in accordance with this embodiment of the present disclosure is provided with a clutch 160 (see FIG. 2) that selectively connects the driving motor 140 to the wheels 131 or cancels the connecting.

Figure 2:
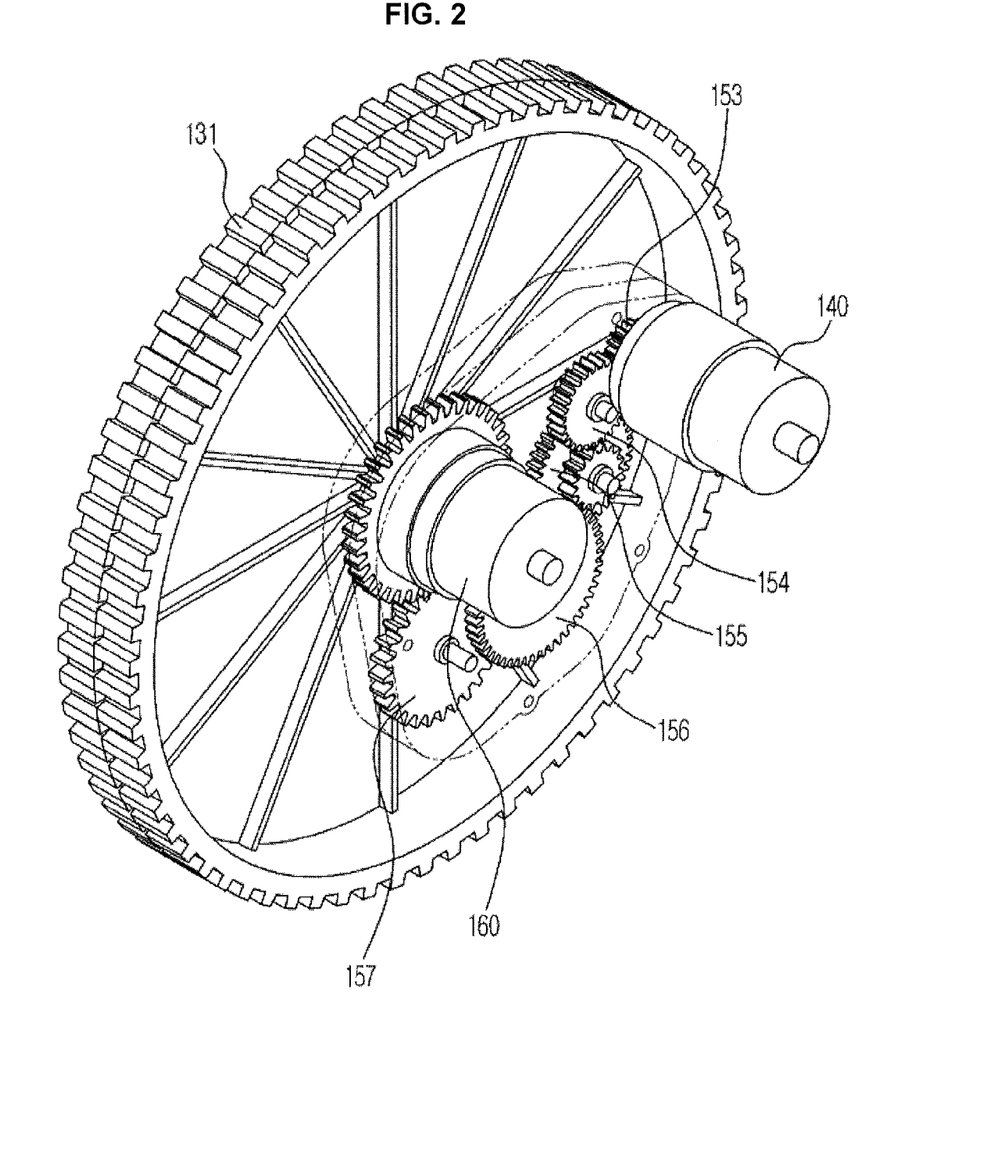
FIG. 2 is an enlarged view illustrating a wheel assembly of the vacuum cleaner of FIG. 1.

That is, assuming that an active mode represents that the body 110 travels as the wheels 131 rotate by the driving force of the driving motor 140, and a manual mode represents that the body 110 is manually moved as a user pulls the suction hose 114 in a state that the driving motor 140 stops, the clutch 160 connects the driving motor 160 to the wheels 131 to transfer the driving force of the driving motor 140 to the wheels 131 in the active mode, and cancels the connection between the driving motor 140 and the wheels 131 to prevent the driving motor 140 from acting as a load at the time of when the wheels 131 rotate in the manual mode.

Hereinafter, the structure of a wheel assembly of the vacuum cleaner 100 in accordance with an embodiment of the present disclosure will be described with reference to the accompanied drawings.

Figure 3:
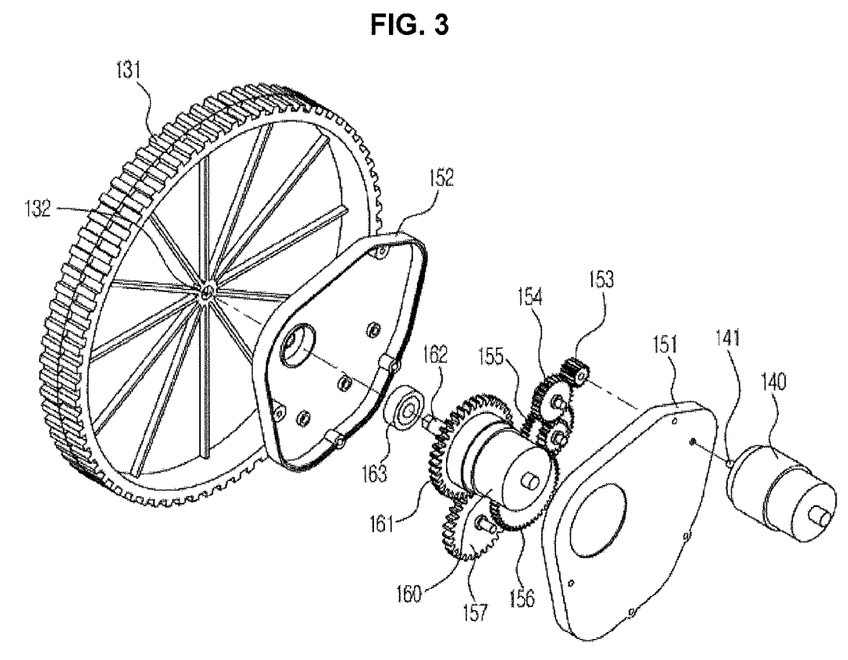
FIG. 3 is an exploded view illustrating parts of the wheel assembly of the vacuum cleaner of FIG. 1.

FIG. 2 is an enlarged view illustrating a wheel assembly of the vacuum cleaner of FIG. 1, and FIG. 3 is an exploded view illustrating parts of the wheel assembly of the vacuum cleaner of FIG. 1.

Referring to FIGS. 2 and 3, the wheel assembly may include the wheels 131 provided at both sides of the body, the driving motor 140 providing the wheels 131 with the driving force, at least one transfer gear (e.g., transfer gears 154, 155, 156 and 157 are provided to be engaged with each other between the driving motor 140 and the wheel 131), and the clutch 160 connecting the driving motor 140 to the wheel 131 to transfer a driving force of the driving motor 140 to the wheel 131 or canceling the connection between the driving motor 140 and the wheel 131 to prevent a detent torque of the driving motor 140 from being transferred to the wheel 131.

The driving motor 140 may be a small sized direct current (DC) motor. The driving motor 140 has a driving shaft 141 parallel to a rotating shaft of the wheel 131. The driving shaft 141 of the driving motor 140 is connected a driving gear 153 to rotate the driving gear 153.

The driving gear 153 may engage with a first transfer gear 154. The first transfer gear 154 rotates in a direction opposite to that of the driving gear 153. The transfer gears 154, 155, 156 and 157 each may be provided with a predetermined reduction ratio. The transfer gears 154, 155, 156 and 157 may be each implemented using a spur gear or a helical gear. Accordingly, the transfer gears 154, 155, 156 and 157 may have rotating shafts parallel to the driving shaft 141 of the driving motor 140 and the rotating shaft of the wheel 131.

The transfer gears 154, 155, 156 and 157 may be accommodated by gear housings 151 and 152 and protected. The gear housings 151 and 152 may include a first gear housing 151 and a second gear housing 152 coupled to each other.

A gear that is most adjacent to the wheel 131 is referred to as a last gear. For example, in this embodiment, the last transfer gear 157 of the transfer gears 154, 155, 156 and 157 is engaged with a clutch gear 161 of the clutch 160. That is, the clutch 160 of the vacuum cleaner 100 in accordance with an embodiment of the present disclosure may be provided between the last transfer gear 157, i.e., the transfer gear most adjacent to the wheel 131, and the wheel 131.

As described above, since the clutch 160 is disposed between the last transfer gear 157, i.e., the transfer gear most adjacent to the wheel 131, and the wheel 131, the wheel 131 is prevented from receiving a detent torque of the driving motor 140 and a rolling resistance of the transfer gears 154, 155, 156 and last transfer gear 157 even when the clutch 160 cancels the connection between the transfer gears 154, 155, 156 and last transfer gear 157 and the wheel 131.

In addition, the above configuration prevents the detent torque of the driving motor 140 and the rolling resistance of the transfer gears 154, 155, 156 and last transfer gear 157 from generating noise.

The clutch 160 may include a coil (not shown), an armature (not shown), a magnet (not shown) and a spring (not shown). The clutch 160 may be implemented using an electronic clutch, in which an armature is pulled by an electromagnetic force when an electric current is applied to the coil, and is returned by a restoring force of the spring when the electric current applied to the coil is disconnected.

The clutch 160 includes a clutch gear 161 engaged with the last transfer gear 157 and a clutch shaft 162 inserted into a shaft coupling groove 132 of the wheel 131. When a power is applied to the clutch 160, a rotational force of the clutch gear 161 is transferred to the clutch shaft 162, and when power applied to the clutch 160 is disconnected, the clutch gear 161 is separated from the clutch shaft 162.

As a result, when a power is applied to the clutch 160, the driving force of the driving motor 140 is appropriately decelerated while passing through the transfer gears 154, 155, 156 and last transfer gear 157 to be transferred to the wheel 131, and when power applied to the clutch 160 is turned off, the connection between the driving motor 140 and the transfer gears 154, 155, 156 and last transfer gear 157 is canceled, so that the wheel 131 is freely rotated without receiving a load from the driving motor 140 and the transfer gears 154, 155, 156 and last transfer gear 157.

The supplying of power to the clutch 160 is controlled in various methods. For example, the clutch 160 may be supplied with power instantly when the body 110 of the vacuum cleaner 100 is directly connected to an external power outlet, and when the connection between the body 110 of the vacuum cleaner 100 and the external power outlet is canceled, the clutch 160 may be turned off.

Alternatively, when power is applied to the driving motor 140 of the wheel assembly, the clutch 160 may be turned on, and when the power applied to the driving motor 140 is disconnected, the clutch 160 may be turned off.

Alternatively, when power is applied to the fan motor of the body 110 of the vacuum cleaner 100, the clutch 160 may be turned on, and when the power applied to the fan motor is disconnected, the clutch 160 may be turned off.

Alternatively, the vacuum cleaner 100 may be provided with an additional switch (not shown) to turn on/off the clutch 160, so that a user may directly turn on/off the clutch 160 by manipulating the switch.

The vacuum cleaner may be provided in various configurations using any one of the above described methods, and may be included in the aspects of the present application as long as it allows the body 110 to travel in an active manner by a driving force of the driving motor 140, and allows the body 110 to be manually moved without receiving a load of the driving motor 140 when the driving motor 140 stops.

Figure 4:
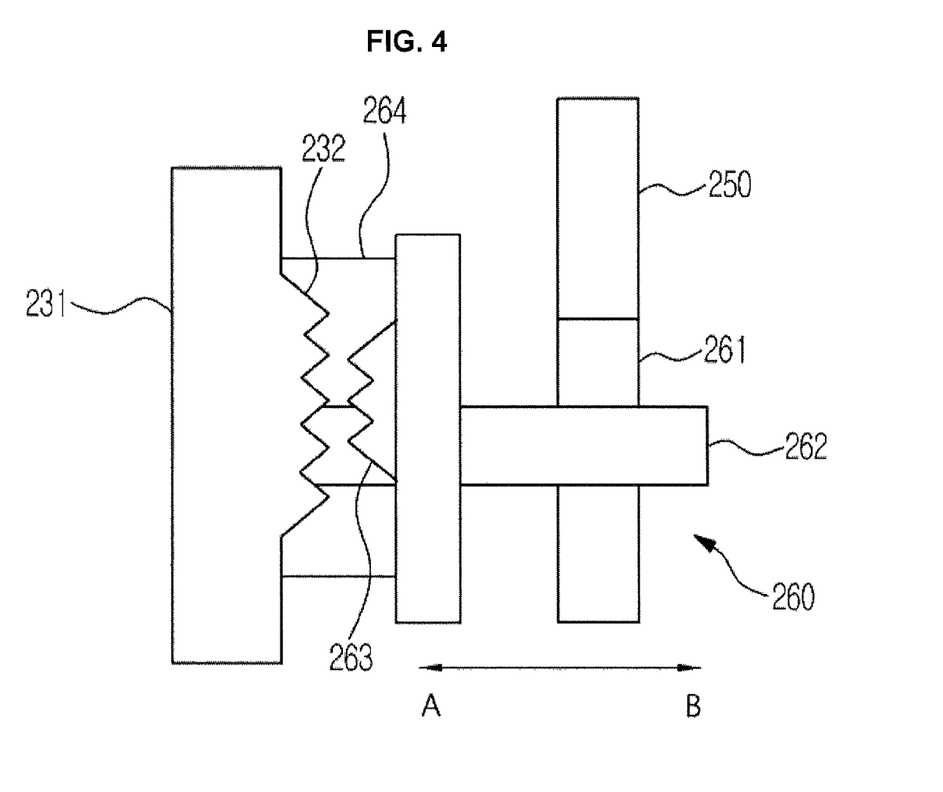
FIG. 4 is a schematic view illustrating a wheel assembly of a vacuum cleaner in accordance with an embodiment of the present disclosure.

FIG. 4 is a schematic view illustrating a wheel assembly of a vacuum cleaner in accordance with an embodiment of the present disclosure.

Hereinafter, a wheel assembly in accordance with the embodiment of the present disclosure will be described with reference to FIG. 4. In the following description, details of parts identical to those previously disclosed will be omitted in order to avoid redundancy.

A clutch 260 may be implemented in a mechanical clutch 260 using a thrust of a gear.

The clutch 260 includes a clutch gear 261 engaged with a last transfer gear 250 among transfer gears, a clutch shaft 262 connected to the clutch gear 261, a shaft cam 263 provided at one end of the clutch shaft 262 to be connected to a wheel 231, and an elastic member 264 allowing the wheel 231 to be separated from the shaft cam 263 by returning the cam 263 to its original position, which is the cam 263 being separated from a wheel cam 232, when the driving motor 140 is shut off. The wheel 231 is provided with the wheel cam 232 coupled to the shaft cam 263.

Through such a structure, as the transfer gear 250 is rotated by operation of the driving motor 140, the clutch gear 261 engaged with the transfer gear 250 moves in one direction (A) by a thrust of the transfer gear 250, so that the shaft cam 263 is meshed with the wheel cam 232. In this case, the transfer gear 250 and the clutch gear 261 may be each provided as a helical gear to generate a larger thrust.

On the contrary, when the driving motor 140 stops operating, the clutch shaft 262 moves to the opposite direction (B) by the restoring force of the elastic member 264, so that the shaft cam 263 is separated from the wheel cam 232.

Accordingly, when the driving motor 140 operates, the mechanical clutch 261 connects the wheel 231 to the driving motor 140, and when the driving motor 140 stops operating, the connection between the wheel 231 and the driving motor 140 is canceled.

Accordingly, without an additional power, the mechanical clutch 261 may connect the driving motor 140 to the wheel 231 or cancel the connection between the driving motor 140 and the wheel 231 through thrust of the gear.

Figure 5:
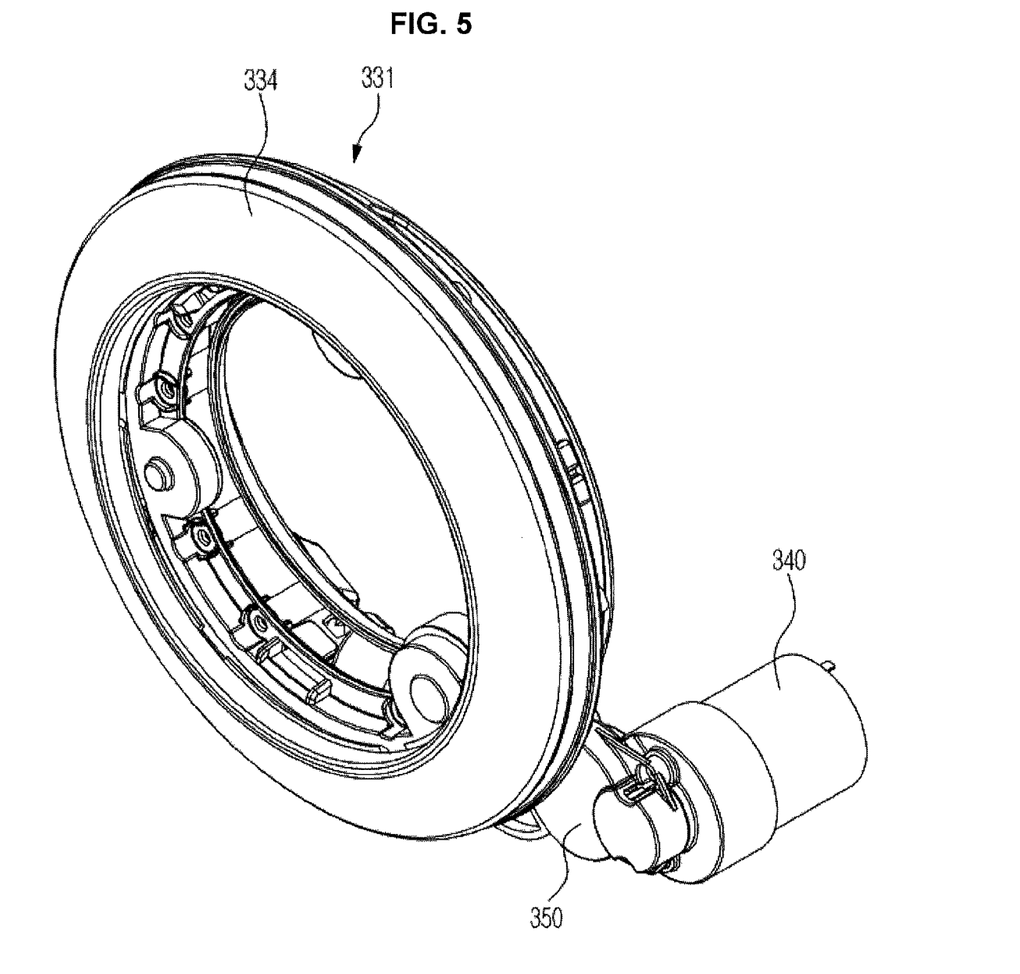
FIG. 5 is a view illustrating a wheel assembly of a vacuum cleaner in accordance with an embodiment of the present disclosure.
Figure 6:
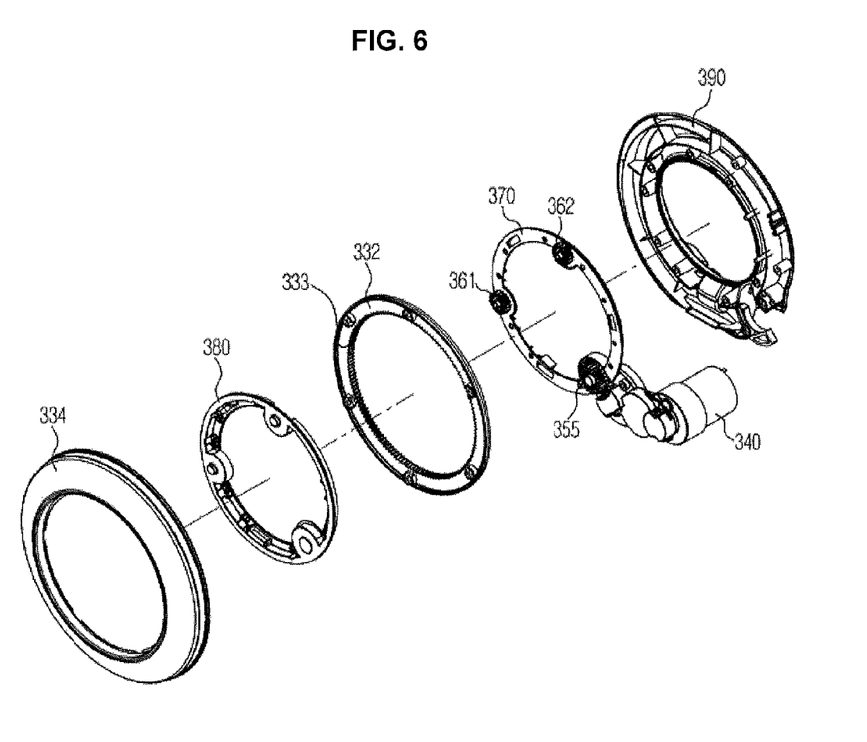
FIG. 6 is an exploded view illustrating parts of the wheel assembly of the vacuum cleaner of FIG. 5.
Figure 7:
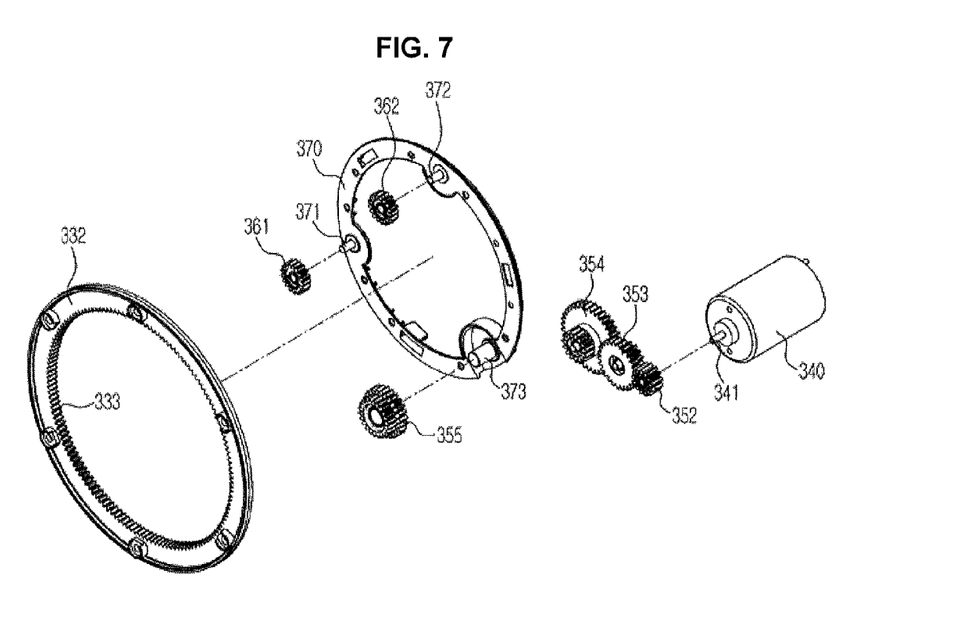
FIG. 7 is a perspective view used to explain an engagement structure of gears of the wheel assembly of the vacuum cleaner of FIG. 5.
Figure 8:
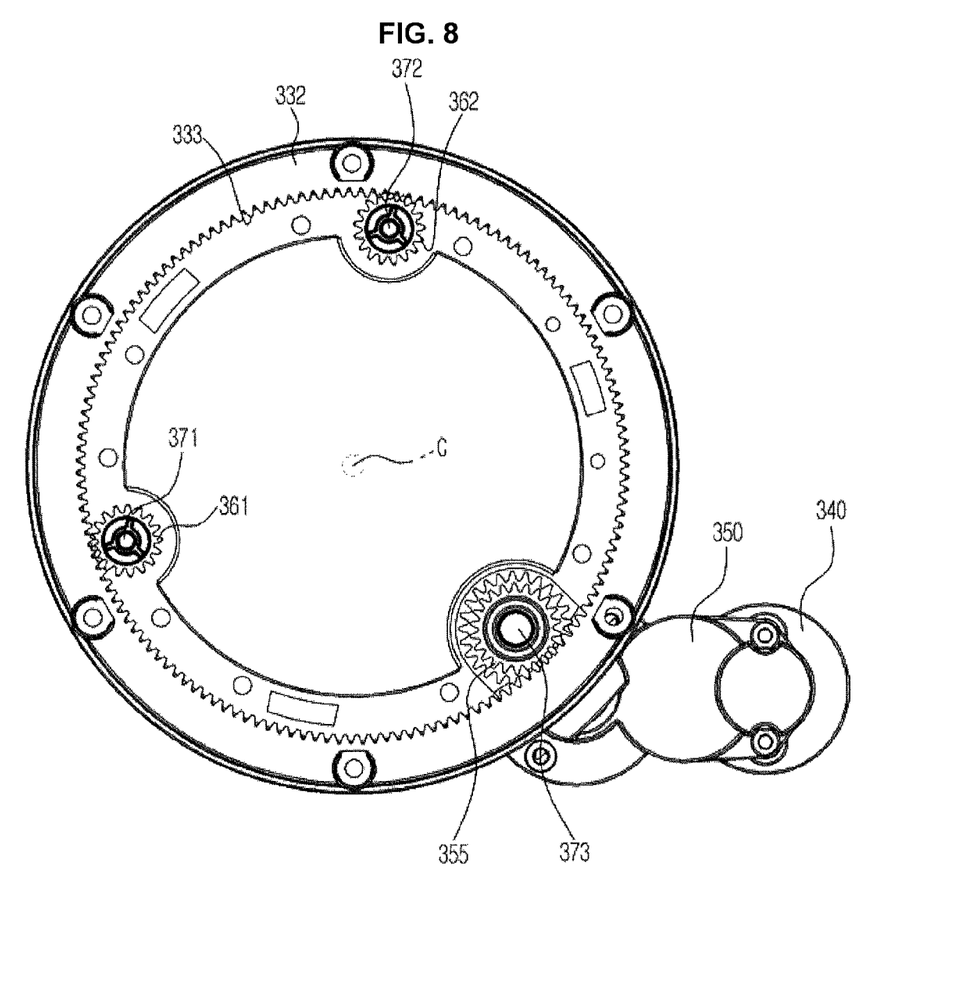
FIG. 8 is a plan view used to explain an engagement structure of gears of the wheel assembly of the vacuum cleaner of FIG. 5.

FIG. 5 is a view illustrating a wheel assembly of a vacuum cleaner in accordance with an embodiment of the present disclosure, FIG. 6 is an exploded view illustrating parts of the wheel assembly of the vacuum cleaner of FIG. 5, FIG. 7 is a perspective view used to explain an engagement structure of gears of the wheel assembly of the vacuum cleaner of FIG. 5, and FIG. 8 is a plan view used to explain an engagement structure of gears of the wheel assembly of the vacuum cleaner of FIG. 5.

Hereinafter, a wheel assembly in accordance with an embodiment of the present disclosure will be described with reference to FIGS. 5 to 8. In the following description, details of parts identical to those previously disclosed will be omitted in order to avoid redundancy.

A wheel assembly may include wheels 331 provided at both sides of the body 110, respectively, a driving motor 340 providing the wheels 331 with a driving force, and at least one transfer gear 353, 354 and 355 engaged with each other between the driving motor 340 and the wheel 331.

The wheel 331 is formed as an inner wheel 332 is coupled to an outer wheel 334. The inner wheel 332 and the outer wheel 334 may be each provided in a ring shape.

The driving motor 340 may be a small DC motor. A driving shaft 341 of the driving motor 340 is provided in parallel to a rotating shaft ('C' in FIG. 8) of the wheel 331. The driving shaft 341 of the driving motor 340 is connected to a driving gear 352 to rotate the driving gear 352.

A first transfer gear 353 is engaged with the driving gear 352, so as to rotate in a direction opposite to a direction of the driving gear 352. The transfer gears 353, 354 and 355 are each provided with appropriate deceleration ratios. The transfer gears 353, 354 and 355 are each provided as a spur gear or a helical gear. The transfer gears 353, 354 and 355 are provided with rotating shafts, respectively, that are parallel to the driving shaft 341 of the driving motor 340 and the rotating shaft of the wheel 331.

The transfer gears 353, 354 and 355 are accommodated in a gear housing 350 to be protected.

The inner wheel 332 is provided with an internal gear 333 configured to be engaged with a last transfer gear 355 among the transfer gears 353, 354 and 355. As the last gear 355 rotates, the internal gear 333 is rotated, thereby rotating the wheel 331.

Accordingly, the last transfer gear 355 is defined as a gear connected to the wheel 331 to directly transfer a driving force. Since the last transfer gear 355 makes contact with the inside of the wheel 331, a rotating shaft 373 of the last transfer gear 355 is not aligned with a rotating shaft ('C' in FIG. 8) of the wheel 331.

As described above, when compared to a wheel having a rotating shaft aligned with a rotating shaft of a transfer gear which transmits a driving force to the wheel, the wheel 331 in accordance with the embodiment of the present disclosure enables an interior space of the wheel 331 and a space corresponding to the interior space to be utilized, thereby providing a variety of wheel designs for a vacuum cleaner.

The wheel assembly may further include one or more idle gear 361 and 362 that are engaged with the internal gear 333 of the wheel 331 to support rotation of the wheel 331. The idle gears 361 and 362 rotate together with the wheel 331, support the wheel 331, and provide a smoother rotation for the wheel 331.

The wheel assembly may be further provided with a support frame 370 supporting the last transfer gear 355 and the idle gears 361 and 362, a cover frame 380 coupled to one side of the support frame 370 to accommodate the last transfer gear 355 and the idle gears 361 and 362, and a main frame 390, coupled to the opposite side of the support frame 370, to support the support frame 370.

The support frame 370, the cover fame 380, and the main frame 390 may be each provided in a ring shape.

The support frame 370 may be provided with a rotating shaft 373 rotatably supporting the last transfer gear 355, and rotating shafts 371 and 372 rotatably supporting the idle gears 361 and 362.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vacuum cleaner comprising:
   a wheel;
   a driving motor configured to provide the wheel with a driving force;
   transfer gears provided to be engaged with each other between the driving motor and the wheel; and
   a clutch disposed between the wheel and one of the transfer gears most adjacent to the wheel, the clutch being configured to connect the transfer gears to the wheel such that the driving force of the driving motor is transferred to the wheel or to disconnect the transfer gears from the wheel to prevent a detent torque of the driving motor and a rolling friction of the transfer gears from being transferred to the wheel while preventing noise due to the detent torque and the rolling friction from occurring.

2. The vacuum cleaner of claim 1, wherein a driving shaft of the driving motor is provided to be parallel to a rotating shaft of the wheel.

3. The vacuum cleaner of claim 1, wherein the transfer gears are each provided as a spur gear or a helical gear.

4. The vacuum cleaner of claim 1, further comprising a gear housing configured to accommodate the transfer gears.

5. The vacuum cleaner of claim 1, wherein the clutch is an electronic clutch using an electromagnetic force.

6. The vacuum cleaner of claim 5, wherein if power is applied to the driving motor, power is applied to the electronic clutch to connect the transfer gears to the wheel, and if no power is applied to the driving motor, the electronic clutch is off and the transfer gears are disconnected from the wheel.

7. The vacuum cleaner of claim 5, wherein the electronic clutch includes a clutch engaged with the one of the transfer gears most adjacent to the wheel, and a clutch shaft inserted into the wheel to transfer the driving force to the wheel.

8. The vacuum cleaner of claim 1, wherein the clutch is a mechanical clutch using a thrust of a gear.

9. The vacuum cleaner of claim 8, wherein the mechanical clutch comprises:
   a clutch gear engaged with the one of the transfer gears most adjacent to the wheel;
   a clutch shaft connected to the clutch gear;
   a cam provided at one end of the clutch shaft so as to be connected to the wheel; and
   an elastic member allowing the cam to be elastically biased in a direction getting distant from the wheel when no power is applied to the driving motor.

10. The vacuum cleaner of claim 9, wherein if power is applied to the driving motor, the cam is connected to the wheel by a thrust of the clutch gear in an axial direction, and if no power is applied to the driving motor, the cam is disconnected from the wheel by an elastic force of the elastic member.

11. The vacuum cleaner of claim 1, further comprising a body, and
   wherein the wheel being a plurality of wheels respectively provided at both sides of the body.

12. A vacuum cleaner comprising:
   a wheel;
   a driving motor configured to provide the wheel with a driving force; and
   transfer gears provided to be engaged with each other between the driving motor and the wheel,
   wherein the wheel comprises an internal gear engaged with a last transfer gear, which is one of the transfer gears most adjacent to the wheel, the internal gear to receive the driving force.

13. The vacuum cleaner of claim 12, wherein a rotating shaft of the last transfer gear is deviated from a rotating shaft of the wheel.

14. The vacuum cleaner of claim 12, wherein a driving shaft of the driving motor is provided to be parallel to a rotating shaft of the wheel.

15. The vacuum cleaner of claim 12, wherein the transfer gears are each provided as a spur gear or a helical gear.

16. The vacuum cleaner of claim 12, further comprising one or more idle gears provided to be engaged with the internal gear, the one or more idle gears to rotatably support the wheel.

17. The vacuum cleaner of claim 16, further comprising a support frame to support the last transfer gear and the one or more idle gears.

18. The vacuum cleaner of claim 17, further comprising a cover frame coupled to the support frame, the cover frame to accommodate the last transfer gear and the one or more idle gears.

19. The vacuum cleaner of claim 11, further comprising a body, and
   wherein the wheel being a plurality of wheels respectively provided at both sides of the body.

20. A drive assembly of a vacuum cleaner, the drive assembly comprising:
   a wheel to receive a driving force;
   a driving motor configured to provide the wheel with the driving force;
   transfer gears provided to be engaged with each other between the driving motor and the wheel, the transfer gears comprising a last transfer gear, which is one of the transfer gears most adjacent to the wheel, wherein the wheel comprises an internal gear engaged with the last transfer gear; and
   a clutch disposed between the wheel and the last transfer gear, the clutch being configured to connect the transfer gears to the wheel such that the driving force of the driving motor is transferred to the wheel or to disconnect the transfer gears from the wheel to prevent a detent torque of the driving motor and a rolling friction of the transfer gears from being transferred to the wheel while preventing noise due to the detent torque and the rolling friction from occurring.

* * * * *